(12) United States Patent
Bethune

(10) Patent No.: US 6,212,953 B1
(45) Date of Patent: *Apr. 10, 2001

(54) MEASURING RECEPTACLE HAVING ANGLED LINES

(75) Inventor: Donald Raymond Peter Bethune, Hamilton (NZ)

(73) Assignee: Measurite Corporation Limited, Frankton Hamilton (NZ)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/155,332

(22) PCT Filed: Mar. 21, 1997

(86) PCT No.: PCT/NZ97/00035

§ 371 Date: Nov. 6, 1998

§ 102(e) Date: Nov. 6, 1998

(87) PCT Pub. No.: WO97/35506

PCT Pub. Date: Oct. 2, 1997

(30) Foreign Application Priority Data

Mar. 28, 1996 (NZ) ......................................... 286276

(51) Int. Cl.⁷ .................................................. G01F 19/00
(52) U.S. Cl. ................................................................ 73/427
(58) Field of Search ........................... 73/427, 426, 1.73, 73/1.74; D10/46.2

(56) References Cited

U.S. PATENT DOCUMENTS

| 4,079,629 | * | 3/1978 | Hope ...................................... 73/427 |
| 4,293,084 | | 10/1981 | Lussier ................................. 222/158 |

FOREIGN PATENT DOCUMENTS

2142523 * 1/1985 (GB) .

\* cited by examiner

Primary Examiner—William Oen
(74) Attorney, Agent, or Firm—Darby & Darby

(57) ABSTRACT

This invention relates to a receptacle (1) capable of holding fluid and having one or more sets of fluid level indicators, wherein a set of fluid level indicators (3) comprises at least two markings (5), characterized in that when the level indicators are viewed during use of the receptacle, the markings do not extend to the pouring mouth of the receptacle (7).

16 Claims, 2 Drawing Sheets

MEASURING RECEPTACLE HAVING ANGLED LINES

TECHNICAL FIELD

This invention relates to a receptacle. In particular, this invention relates to receptacles capable of holding fluid.

BACKGROUND ART

Receptacles capable of holding fluid, such as measuring jugs, beakers and measuring cylinders, are well known. Such receptacles have wide ranging domestic and commercial applications. Consumers are familiar with their domestic, especially culinary, application.

Such receptacles are also commonly used in technical fields, notably in dispensaries and laboratories, and a wide range of receptacles are commonly used to dispense and hold particular quantities of fluid materials. Customarily, receptacles such as measuring jugs bear series graduations with differing volumes indicated by horizontal lines circling or marked across the side of the container. The user holds the receptacle in an upright position to fill it with an appropriate quantity of fluid, and dispenses the fluid by constantly tipping the receptacle and returning it to an upright position, until the fluid is down to the desired level as indicated by the horizontal lines or markings.

Further, when it is wished to pour a desired volume of fluid from such a receptacle, the liquid must undertake a series of intermittent small pours, which can only be quantity estimates or guesses in the absence of useable quantity indications during the pour, until the user reaches the desired level. It is extremely easy when having to guess the quantity every time to pour too much fluid out of the receptacle, especially when the user is in a hurry. This can have serious consequences, such as destroying the efficacy of a process. The problems of overfilling and repouring can also prove expensive if costly materials are used, or the pouring process has to be recommenced. The time-consuming nature of having to make a series of small pours is also a problem.

In addition, even if a user judges that the fluid has reached the right level and that the surface of the fluid is aligned with the line segment indicating a certain volume, the short length of the line segment and/or the jug not being held precisely upright results in known measuring receptacles proving inaccurate measuring devices, unable to dispense or hold accurate measures of liquid.

In some receptacles, measuring cylinders in particular, the inaccuracy of horizontal line segments as indicators of levels of liquids was attempted to be addressed by applying marking right around the receptacle. However, fluid is still poured from the receptacle in a series of small pours, with the receptacle being continuously tilted from pouring position to upright position so that the user can see how much more fluid has to be poured or retained in the receptacle to reach the desired level of fluid.

As the fluid approaches the desired level, the process is much more deliberate, careful and time consuming. Measuring jugs are not perfect spheres, so every time the jug angle is changed between the pouring and upright positions the liquid is disturbed producing waves and these have to be allowed time to settle before one can accurately check the alignment of the surface line with the desired indicator line. In addition, if the fluid being dispensed or retained in the receptacle is viscous considerable time is spent in waiting for the fluid to run down the inner surface of the receptacle and settle to enable a reading of the level to be taken.

A major problem with known receptacles such as beakers and cylinders as discussed above is therefore that the receptacle must always be returned from a tilted position when the fluid is being poured to an upright position, so that the fluid surface can be aligned with horizontal markings on the vessel, and the fluid level in the receptacle thus ascertained. This process is time consuming and inaccurate, and often results in more than the desired quantity of fluid being dispensed from the receptacle, or insufficient fluid retained in the receptacle when the operator is in a hurry. This may have disastrous consequences for either the domestic or industrial user.

An improvement on the prior art is the measuring jug shown in FIG. 1. This jug, being an embodiment of the present inventor's own New Zealand Patent No. 211520 possesses level indicator lines radiating from the pouring mouth across the entire surface of the jug. There is also the traditional and separate set of horizontal level indicator lines. The radiating lines are calibrated so that the user can measure the quantity of fluid being dispensed from the container while the container is tilted.

The radiating lines can thus be termed "pouring lines". In use, aligning the surface of the fluid with a pouring line ensures the same amount of fluid is retained in the container when returned to its upright position.

The horizontal lines ("filling lines") are intended to be used as a level or volume guide for filling the jug, and are ranged spatially on a central vertical axis.

The jug of New Zealand Patent No. 211520 permits a desired quantity of fluid to be dispensed in one continuous pour, without continuously needing to return the jug to an upright position to assess how much liquid has been poured. The user can always ascertain, even when the jug is tilted, how much liquid has been poured out and accordingly how much remains in the jug. This system significantly reduces the time taken to dispense liquid.

Although an improvement over known measuring devices, it is now acknowledged that use of the measuring jug in New Zealand Patent No. 211520 still has certain difficulties.

To the user, the two separate scales (ie. the pouring lines and the filling lines) on the jug surface may be confusing. A user may not appreciate the purpose of the pour lines, and may simply ignore them. The user may revert to the customary series of pours, returning the jug to its resting position to measure how much liquid has been poured. The correlation of the pour lines to the horizontal filling lines is accordingly not obvious. As a result, the users do not appreciate the utility of the invention, and the advantages it holds.

A further problem with the jug in New Zealand Patent No. 211520 is that respective pouring lines and filling lines are accorded their own numerical values. The consumer is accordingly faced with a jug surface bearing not only lines extending from the pouring mouth over the entire surface of the jug, but also numbers accompanying these lines. Being so apparently complicated in appearance, manufacturers are reluctant to make the high investment in tooling costs because of doubt about public acceptance of the jug in the market place.

Another disadvantage of the jug of New Zealand Patent No. 211520 is that the two scales—the pouring lines and the filling lines—radiate over the entire surface of the jug. The separate scales of lines must be accurately applied both to provide accurate correlation between pouring lines and filling lines, and to ensure those indicating differing levels are accurately spaced apart. This also holds true for the numbers. The extension of lines and numbers over the jug surface provides difficulties to manufacturers of the jugs—the lines and numerals must be efficiently applied so that manufacture is viable. Yet care must also be taken to ensure the lines are correlated properly, with the jug providing accurate measurements as a result. This process is time consuming, and may require extensive modifications to existing methods of marking jugs, or even the development of new technology.

In particular, there is considerable visual confusion at the pouring mouth of the jug where the lines all converge.

It is accordingly an object of the present invention to overcome the foregoing problems and provide the public with a useful choice.

Further aspects and advantages of the present invention will become apparent from the ensuing description which is given by way of example only.

DISCLOSURE OF INVENTION

According to one aspect of the present invention there is provided a receptacle capable of holding fluid and having one or more sets of fluid level indicators;

wherein a set of fluid level indicators comprises at least two markings, characterised in that when the level indicators are viewed during use of the receptacle the markings do not extend to the pouring mouth of the receptacle.

In a preferred embodiment of the present invention the receptacle capable of holding fluids is a measuring jug. The jug is preferably transparent or translucent with a single outwardly pouring mouth or spout directing poured fluid to issue from a single point located on the mouth.

However, many alternative embodiments of the receptacle are within the scope of the present invention. For example, other embodiments of a receptacle include beakers, flasks, bottles, measuring cylinders, cups, buckets, tanks, hoppers, crucibles, cement mixers and boxes.

Reference throughout this specification will now be made to the receptacle as being a jug. In some embodiments the jug need not be transparent or translucent material such as glass or plastic. It may be made of an opaque material; metal or fibreglass being two materials given by way of example.

In some embodiments jugs may also have more than one mouth. For example, a beaker may be capable of being viewed from varying perspective's and may have a mouth at a place on the rim appropriate to the angle from which the set of level indicators being used are viewed by the operator. For example, there may be six sets of level indicators spaced around the jug, with a separate mouth sited at the appropriate place on the jug for each set.

Fluid may not only be dispensed from the top of a jug. It is envisaged that a jug having alternative pouring means such as a spout, spigot or tap wherein the fluid will leave the jug other than from the top, is within the scope of the invention.

The jug need not be filled with fluid from the top. For example, a jug such as a salt cellar filled from the bottom of the jug is within the scope of the present invention.

The fluid used in a preferred embodiment is liquid, and will hereinafter be referred to as such throughout the specification. However, any substance capable of flowing, including particulate matter, is suitable for use in the present invention. For example, sand, gravel, iron filings, washing powder, powdered milk, and juice concentrate are non liquid materials which may be used in the present invention.

In a preferred embodiment the measuring jug will bear two or more sets of fluid level indicators, arranged in sequential intervals on a side of the measuring jug facing the operator when held by same. Preferably the side of the measuring jug on which the fluid level indicators are marked as flat as possible, to promote ease of application of the markings, and also accuracy of the markings.

Accuracy can be further improved by having matching markings on the further wall of the jug as well as providing an additional reference point, and cross check that the jugs vertical plane is truly vertical.

The measuring jug may in some embodiments be capable of being operated with a number of surfaces facing the operator, and sets of fluid level indicators may appear on each surface facing the operator.

Fluid level indicators may also be spiralled around the circumference of inner and outer surfaces of the measuring jug, which may indeed promote ease of use by the operator.

Sets of fluid level indicators may be arranged at close intervals such that the fluid levels indicated differ only slightly, or may be spaced at distant intervals such that widely varying volumes of fluid can be measured and poured from any one measuring jug.

Alternatively, a set of level indicators indicating the same level may be placed at the same height on opposite sides of the measuring jug. In use, the operator will be able to look through the measuring jug (if transparent or translucent) and align the pair of fluid level indicators.

For open topped containers such as buckets made from non-transparent material, the indicator markings can be made or shown on one or both facing inner walls where the user is able to clearly see them from above.

The use of two walls can further promote accuracy of measurement.

The markings in some embodiments may be located on a vertical transparent strip or transparent patches.

The applicant has recognised that it is possible for a user of the jug to sideways tilt it off a central vertical axis. Thus, while on one side of the jug the fluid level may be aligned with markings equating to the desired volume, the other side of the jug may have the fluid level misaligned with the equivalent markings which obviously leads to inaccuracies when pouring.

Twin or matched markings on either face of the jug enhance its accuracy by letting the user see whether the liquid is even on both sides.

Alternatively, in some embodiments of the present invention there may be provided horizontal level indicators on the back face of the jug directly opposite to the pouring mouth to indicate if a person is pouring on the vertical axis.

In another variation those lines or points on the back edge of the jug can be located to show or confirm the quantity still in the jug while at pouring angle.

In some embodiments of the present invention there may be provided additional markings associated with the horizontal level indicators that indicate the volume to be poured. For example, if one litre is required to be poured, then there could be a line (or other marking) at the back of the jug with one litre written next to it.

In even more advanced embodiments of the present invention there could be provided two sets of horizontal markings at the back of the jug, one set which indicates the volume to be poured when the jug is in its resting state and another set which indicates the level to which the fluid should be when the required amount has been poured.

In some embodiments horizontal lines on the back of the jug may replace the preferred embodiment of lines on the face of the jug.

The number and spacing of the fluid level indicators on the measuring jug can vary depending on the user's requirements, the shape and size of the measuring jug, and the manufacturing process.

According to an alternate aspect of the invention there is provided a receptacle capable of holding fluid and having one or more sets of fluid level indicators;

wherein a set of fluid level indicators comprises at least two markings, and where each set of fluid level indicators is accorded a single value representing the volume of fluid retained in the receptacle when the surface level of the fluid corresponds with the either the first or second marking in that set.

In yet another aspect of the invention there is provided a method of marking a receptacle having one or more sets of fluid level indicators, characterised by the steps of, a) marking the receptacle with a first mark consistent with a fluid level when the receptacle is in a filling orientation, and b) marking the receptacle with a second mark consistent with a fluid level when the receptacle is in a pouring orientation, wherein the markings represent the level of the same amount of fluid in two orientations of the receptacle.

In a preferred embodiment of the present invention a set of fluid level indicators comprises at least two markings which do not extend to the pouring mouth of the measuring jug when the fluid level indicators may be viewed by the operator during use of the measuring jug.

A single fluid level indicator indicates the amount of fluid retained in the jug when the jug is in either of two positions.

In a preferred embodiment, the two markings comprise two lines forming, or appearing to form, an acute angle. The first line (herein before referred to as a filling line when discussing New Zealand Patent No. 211520) is substantially horizontal when the jug is in a resting position, and the arrangement of the second line (previously referred to as the pouring line) is such that in use tilting the jug from its resting position and pouring fluid from the jug until the liquid surface corresponds with the second angled line in a set will retain fluid in the resting vessel to the level indicated by the first horizontal line in that set.

A third mark may also be applied which can represent a value associated with the fluid level. This can also coincide with the fluid level at specific quantity points during pouring or may be supplementary filling lines.

In this manner markings are applied to the jug consistent with a fluid level when the jug is at a particular orientation.

In a preferred embodiment of the present invention the pouring orientation of the jug refers to when the jug is tilted to allow fluids to be poured from the jug.

In a preferred embodiment of the present invention the filling orientation of the jug refers to when the jug is sitting in a stable resting position on its base, with the base preferably being on a flat surface.

In the above preferred embodiment the measuring jug is used to dispense fluids. However, the present invention also includes a jug intended to move between different positions, with the markings within the sets of level indicators used in the same way. That is, the jug is not necessarily moved from a filling position to a pouring position, but is capable of being moved into differing positions in relation to the other positions indicated by the fluid level indicators. An example of this alternative embodiment of the invention would be a mercury switch or series of switches which open when the receptacle exceeds specific angles of pouring. Such switching may control indicator lights for the operator, or motive power controlling the tilting of the container, as examples.

In a preferred embodiment where the measuring jug is used to dispense fluid, aligning the surface of the fluid with the second angled line (the pouring line) when the jug is tilted will signify to the user that when the jug is upright, the same volume of fluid indicated by the pouring line will be left in the jug when the jug is returned to its resting position. In this way, a single continuous pour can be is made, rather than a series of little pours interspersed with returning the jug to an upright position, after every pour.

In a preferred embodiment of the markings, the two lines converge to one point, but any combination of lines indicating a correlated pouring line and filling line is within the scope of the invention. For example the pour and fill lines may be marked with dotted line segments, which do not physically intersect. A user may extrapolate these lines to observe a point where he or she perceives the lines would meet if of a greater length.

While in some embodiments the markings may form an obtuse angle, in preferred embodiments of the present invention have the markings forming an acute angle.

Preferably the two lines are marked on the measuring jug with paint for ease of manufacture. However, in other embodiments the markings may comprise solid or dotted lines engraved into the inner or outer measuring jug surface, or moulded into the measuring jug.

In the present invention, the markings in a set of level indicators can be shortened, and do not extend to the pouring mouth of the measuring jug when the operator is using that set of markings to dispense or retain a certain volume of fluid. The markings need only to extend over a small section of the jug, not the entire surface of the jug. This has obvious advantages for manufacturers and users of the measuring jug.

For manufacturers, it will be easier, less time consuming and cheaper to not have to extend two separate scales of lines over a jug surface, as is the case with New Zealand Patent No. 211520. The markings comprising a set of fluid level indicators form a small unit/symbol on the jug surface with the markings comprising line segments rather than long lines in the preferred embodiment. In fact, the line segments may be as small as will permit alignment with a surface level of fluid, depending on the user's requirements for accuracy.

The markings not extending to the pouring mouth will have obvious benefits for consumers. It is easier for consumers to appreciate that the two lines in a set of level indicators (in the preferred embodiment of the jug ie. the pouring line and filling line) are correlated. The system of operation, and underlying concept will be more apparent to the operator.

The above description of the receptacles and fluid envisaged for use in the present invention is incorporated in the second aspect of the invention. However, in this aspect of the invention, the set of at least two markings may extend to the visual perimeters of the measuring jug. For example, the measuring jug may comprise a double skinned glass container, holding inside it one or more rings circling the circumference of the container. The ring would be anchored at opposite points in such a way that it would remain level during tilting of the container. The container could be marked in some way such that aligning the concentric ring, the surface of the liquid and the mark would enable straight single pours in the manner described above, with the associated advantages.

In this aspect of the invention, each set of level indicators is accorded a single fluid level value symbol representing the volume of fluid retained in the measuring jug when the surface level of the fluid is aligned with either marking in that set. Because of the correlation of the markings comprising a set of level indicators, the need in the prior art for separate sets of value symbols—one set provided for the pouring or angled line and one set for the filling or resting line, is obviated. One value symbol applies to both markings in any given set of level indicators.

In the preferred embodiment, the value symbol is marked on the measuring jug at or about the point of actual or perceived convergence of the markings. Markings need not actually converge, but should extend close enough to one point such that it is apparent that the single value symbol can be accorded to both markings in the set.

The value symbol markings need not have a value symbol physically recorded on the measuring jug. For example, each set of level indicators may be individually assigned relevant value symbols representing volume by the operator. Alternatively, the value symbols could be denoted by numbers, letters, words, colours or symbols.

For example, in a procedure an operator may have to fill the measuring jug to the level indicator having yellow markings, and pour out liquid until the liquid level is reduced to the level having blue markings. This illustrates that the fluid level value symbols can be assigned value symbols of relevance to the operator, rather than being assigned straight numerical volume indicators eg 500 ml.

Each volume indicator indicates what volume of liquid is in the measuring jug when the surface level of the liquid is aligned with either marking in any given set. The volume indicators may be used to indicate either the amount of liquid remaining in the measuring jug or the amount of liquid that has been dispensed from the measuring jug—or may also have indicators arranged so as to show both of these features.

The measuring jug of the present invention is much simpler to produce and use than those currently known in the art. The design of the present invention will be less confusing to users, and will lower the potential for error in operation of the measuring jug. This has obvious benefits for both domestic and industrial users.

BRIEF DESCRIPTION OF DRAWINGS

Further aspects of the present invention will become apparent from the following description which is given by way of example only and with reference to the accompanying drawings in which.

BEST MODES FOR CARRYING OUT THE INVENTION

Figure 1:
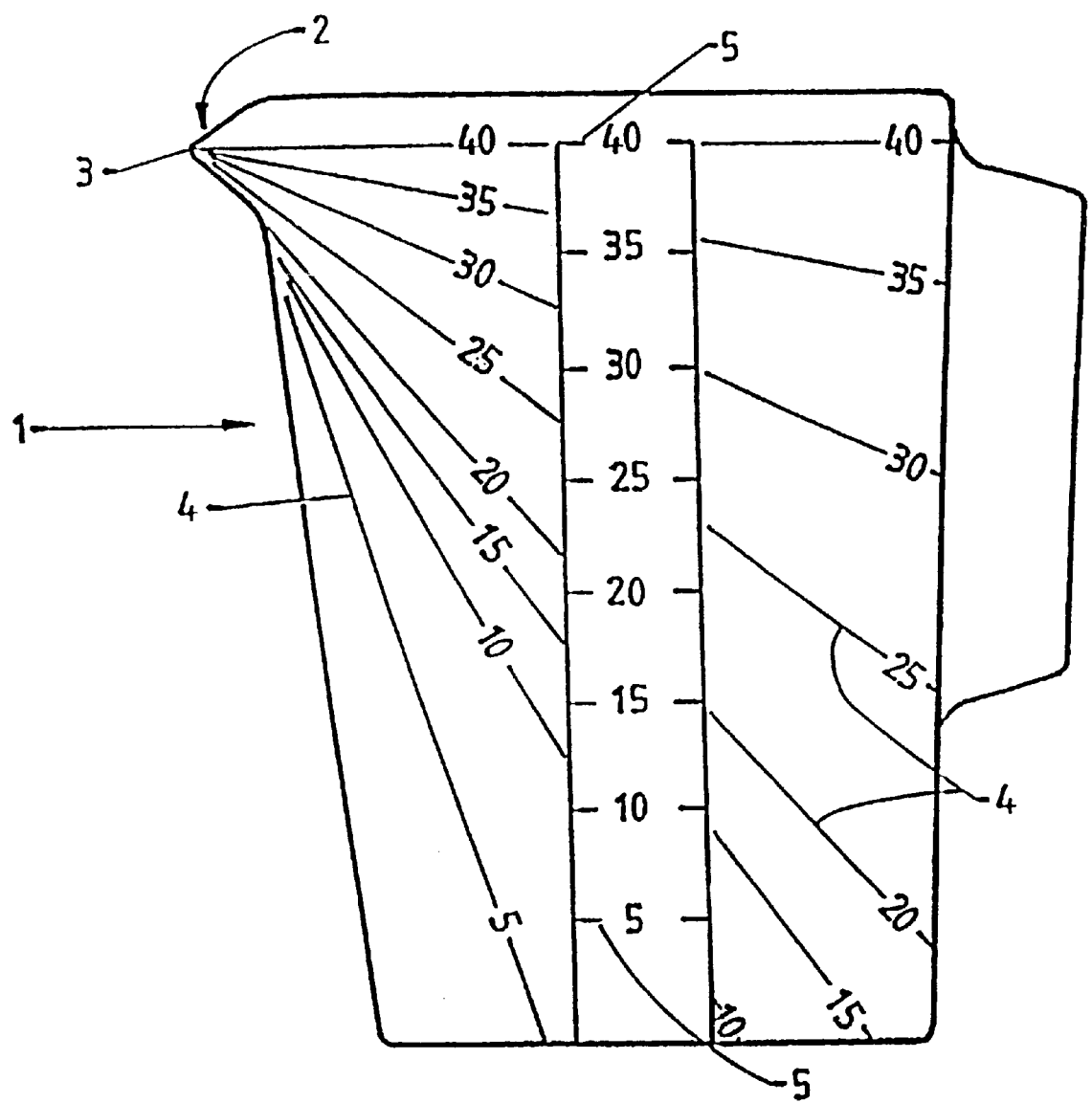
FIG. 1 is a side view of a jug with graduated markings in accordance with an embodiment of New Zealand Patent No. 211560.

The jug illustrated in FIG. 1 shows the closest prior art and is included to highlight the advantages of the present invention thereover.

Figure 2:
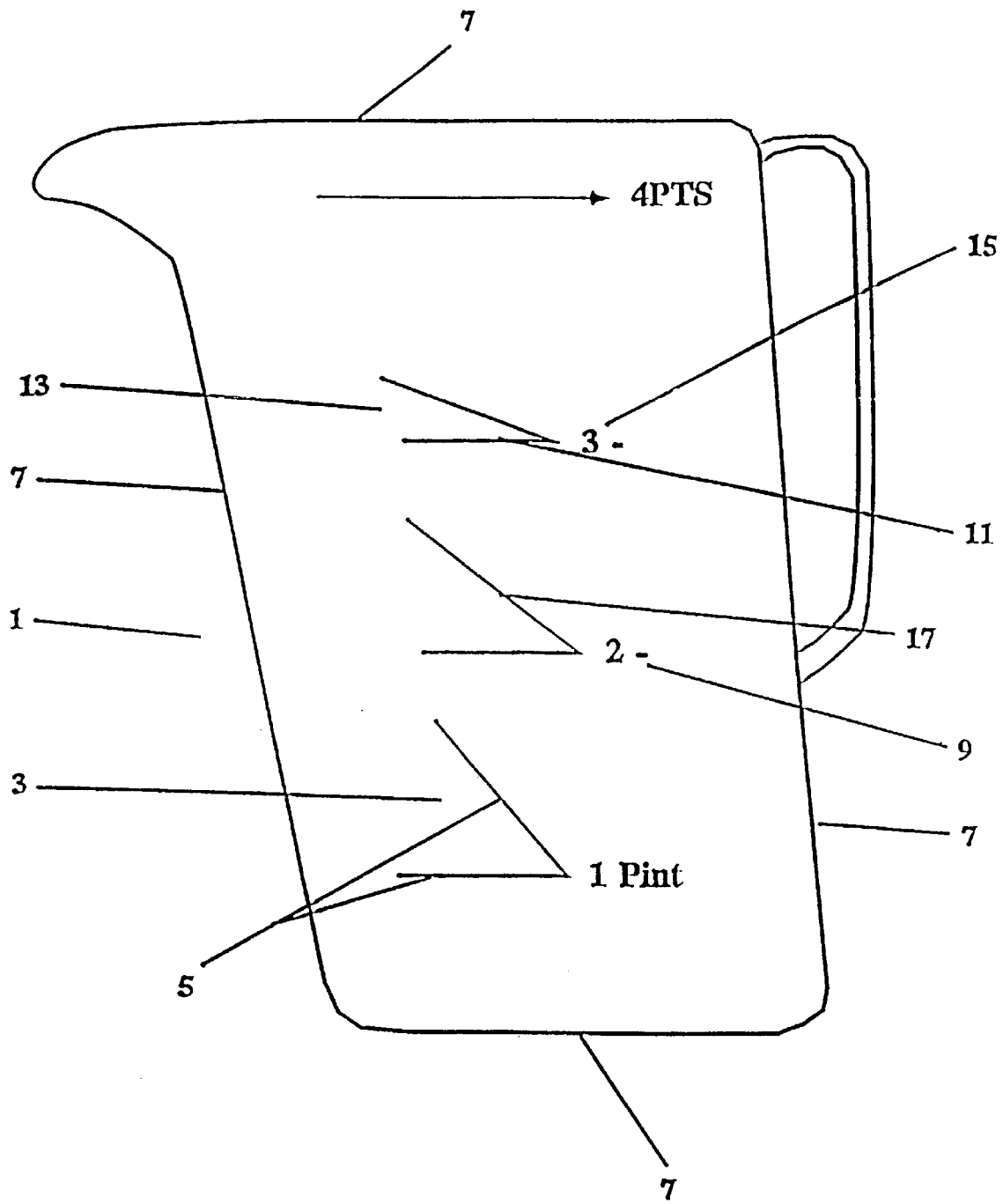
FIG. 2 is a side view of a jug with dual calibrated markings in accordance with an embodiment of the present invention.

Referring to FIG. 2, the receptacle holding fluid is represented by a measuring jug 1. A set of fluid level indicators 3 consists of the two markings, being the lines 5. The lines 5 do not extend to the visual perimeters 7 of the measuring jug 1.

In this embodiment, the three sets of fluid level indicators also have a volume indicator eg a volume of two pints is represented by 9 placed at the convergence of the lines 5.

It can be clearly seen that the indicators on the jug in FIG. 2 are less cluttered and gives greater visual acuity than the jug in FIG. 1.

In use, an operator will fill the measuring jug 1 with liquid to a certain level. For example, if it is wished to dispense a pint of liquid a user may fill the jug 1 until the surface of the fluid corresponds with the level represented by the horizontal filling line 11 in the set of markings 13 having the three pint numerical volume indicator 15. To dispense one pint of fluid, the jug is tilted in one continuous pour until, while tilted, the surface corresponds with the angled pour line 17 in the set of level indicators represented by the two pint volume indicator 9.

When returned to resting position the surface of the water will align with the horizontal line in that set, and one pint will have been easily and continuously poured. The process can obviously be repeated at will, and also pertains to retention of liquid in the measuring jug as well as to the dispensing of liquid from a measuring jug.

Aspects of the present invention have been described by way of example only and it should be appreciated that modifications and additions may be made thereto without departing from the scope of the appended claims.

What I claimed is:

1. A receptacle for holding a liquid to be poured therefrom, said vessel having a vertical wall and a pouring mouth at the top end thereof;
   a set of liquid level indicators on said wall comprising two markings, a first marking being substantially horizontal to indicate a first predetermined volume of liquid in the container in a horizontal non-pouring position and a second marking associated with and at an acute angle to said first marking to indicate the same first predetermined volume when the receptacle is in a tilted position for pouring the liquid from said pouring mouth.

2. A receptacle as in claim 1 wherein there are a plurality of said liquid level indicator sets on said wall spaced apart along the height direction of said wall, each set to indicate a respective predetermined volume of liquid in the non-pouring and pouring positions of the receptacle.

3. A receptacle as in claim 2 further comprising a fill line on said wall indicating the volume of liquid to be held by the receptacle.

4. A receptacle as in claim 1 further comprising a liquid level symbol on said wall associated with said liquid level indicator set to indicate the volume of liquid in said receptacle represented by said set.

5. A receptacle as in claim 2 further comprising a liquid level symbol on said wall associated with each said liquid level indicator set to indicate the volume of liquid in said receptacle represented by each said set.

6. A receptacle as in claim 2 wherein the second markings of the plurality of liquid level indicator sets do not converge at said pouring mouth.

7. A receptacle as in claim 2 wherein the acute angle of the markings of each of the liquid level sets decreases from the bottom to top of the receptacle.

8. A receptacle as in claim 2 wherein a said second marking of each set terminates spaced from the first marking of the next set above it.

9. A receptacle for holding a liquid to be poured therefrom, said receptacle having a vertical wall and a pouring mouth at the top end thereof;
   a plurality of sets of liquid level indicators spaced apart vertically on said wall, each said set comprising two markings, a first marking being substantially horizontal to indicate a first predetermined volume of liquid in the container in a horizontal non-pouring position and a second marking associated with and at an acute angle to said first marking to indicate the same first predetermined volume when the receptacle is in a tilted position for pouring the liquid from said pouring mouth, the sets spaced apart and the second marking of any one set having a length such that such said second marking does not extend above or intersect any marking or extension thereof of a set above said any one set.

10. A receptacle as in claim 9, further comprising a liquid level symbol on said wall associated with each said liquid level indicator set to indicate the volume of liquid in said receptacle represented by each said set.

11. A receptacle as in claim 9 wherein said receptacle is the marking of each said set occupying less than one-quarter of the perimeter of the wall of the receptacle.

12. A receptacle as in claim 11 wherein the vertical wall is generally cylindrical and the markings occupy less than one quarter of the circumference of the wall.

13. A receptacle for holding a liquid to be poured therefrom, said receptacle having a continuous vertical wall and a pouring mouth at the top end thereof;

a set of liquid level indicators on said wall comprising two markings, a first marking being substantially horizontal to indicate a first predetermined volume of liquid in the container in a horizontal non-pouring position and a second marking associated with and at an acute angle to said first marking to indicate the same first predetermined volume when the receptacle is in a tilted position for pouring the liquid from said pouring mouth, and wherein the markings of a set occupy less than one quarter of the perimeter of the vertical wall of the receptacle.

14. A receptacle as in claim 13 wherein the vertical wall is generally cylindrical and the markings occupy less than one quarter of the circumference of the wall.

15. A receptacle as in claim 13 wherein there are a plurality of said liquid level indicator sets on said wall spaced apart along the height direction of said wall, each set to indicate a respective predetermined volume of liquid in the non-pouring and pouring positions of the receptacle and wherein the second marking of each said set having a length such that a said second marking of any one set does not extend above or intersect any marking or extension thereof of a set above said one set.

16. A receptacle as in claim 15 further comprising a liquid level symbol on said wall associated with said liquid level indicator set to indicate the volume of liquid in said receptacle represented by said set.

* * * * *